United States Patent
Noguchi et al.

(10) Patent No.: US 8,527,178 B2
(45) Date of Patent: Sep. 3, 2013

(54) CONTROL APPARATUS FOR FOUR-WHEEL DRIVE VEHICLE

(75) Inventors: Masatoshi Noguchi, Wako (JP); Hirohiko Totsuka, Wako (JP); Yuji Okamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 321 days.

(21) Appl. No.: 12/958,589

(22) Filed: Dec. 2, 2010

(65) Prior Publication Data

US 2011/0137531 A1   Jun. 9, 2011

(30) Foreign Application Priority Data

Dec. 7, 2009   (JP) ................................. 2009-277166
Nov. 10, 2010   (JP) ................................. 2010-251522

(51) Int. Cl.
*G06F 19/00* (2011.01)
*G06G 7/70* (2006.01)

(52) U.S. Cl.
USPC .................. 701/99; 701/69; 701/81; 701/89; 180/197; 180/233; 180/245; 477/173; 475/150

(58) Field of Classification Search
USPC ................. 701/36, 69, 81, 89, 94, 95, 74, 84, 701/87, 88, 90, 99–115; 477/169, 173, 174, 477/175, 176, 177; 180/6.64, 197, 233, 247, 180/248; 475/150
See application file for complete search history.

(56) References Cited

U.S. PATENT DOCUMENTS

| | | | | |
|---|---|---|---|---|
| 4,989,686 A | * | 2/1991 | Miller et al. | 180/197 |
| 5,080,187 A | * | 1/1992 | Asano et al. | 180/248 |
| 5,644,488 A | * | 7/1997 | Ito et al. | 701/1 |
| 6,849,017 B2 | * | 2/2005 | Nett | 475/5 |
| 7,497,297 B2 | * | 3/2009 | Watson et al. | 180/248 |
| 2009/0227421 A1 | * | 9/2009 | Saito | 477/175 |

FOREIGN PATENT DOCUMENTS

| | | |
|---|---|---|
| EP | 1 203 688 A2 | 5/2002 |
| EP | 1 400 390 A2 | 3/2004 |
| JP | 63-306925 A | 12/1988 |
| JP | 2-81722 A | 3/1990 |
| JP | 04-103847 | 4/1992 |
| JP | 7-279704 A | 10/1995 |
| JP | 08-207607 | 10/1995 |
| JP | 2001-287559 | 10/2001 |

* cited by examiner

*Primary Examiner* — Thomas H. Tarcza
*Assistant Examiner* — Rami Khatib
(74) *Attorney, Agent, or Firm* — Arent Fox LLP

(57) ABSTRACT

In apparatus for controlling operation of a four-wheel drive vehicle having a prime mover (engine), drive wheels driven by the prime mover and free wheels, a VC (viscous coupling; torque transferring device) installed between the drive wheels and free wheels to transfer torque generated in response to a difference between inputted and outputted rotation thereof, output of the prime mover is decreased based on a desired rotational speed of the drive wheels driven by the prime mover when calculated difference between inputted and outputted rotation of the VC is equal to or greater than a predetermined value, thereby enabling to control the driving force effectively so as to achieve required vehicle driving performance.

8 Claims, 11 Drawing Sheets

$NVCIN \leftarrow VLVFAW \times \#KVFAWTON \times \#GRATTHEL \times \#GRATTHYP$ $NVCOUT \leftarrow VLVRAW \times \#KVRAWTON \times \#GRATRRDF$

CONTROL APPARATUS FOR FOUR-WHEEL DRIVE VEHICLE

BACKGROUND OF THE INVENTION

1. Field of the Invention

This invention relates to a control apparatus for a four-wheel drive vehicle.

2. Description of the Related Art

Various types of four-wheel drive (4WD) vehicles have been developed. Among of them, there is known a type of 4WD vehicle in which driving force transferred from a prime mover to drive wheels (e.g., front wheels) is distributed through a torque transferring device (such as a viscous coupling) to free wheels (e.g., rear wheels), as taught, for example, by Japanese Laid-Open Patent Application No. Sho 63(1988)-306925.

SUMMARY OF THE INVENTION

In this type of the 4WD vehicle, the driving force F is generally determined as $F=\mu N$ (where $\mu$: coefficient of friction, N: contact load). Accordingly, if the drive wheels idles (slips) greatly on a low-friction road when, for instance, the vehicle starts on an ascending slope, the vehicle may lose the driving force of the drive wheels. At that situation, on the other hand, since the torque transferring device is inputted with undue rotation difference due to the drive wheel idling, the device may output excessive driving force at the free wheels.

However, since vehicle driving performance is determined by the total driving force transmitted from the drive wheels and free wheels to road surface, even when the driving force (transmitted from the free wheels to the road surface) increases, the vehicle driving performance will be still be not enough insofar as the driving force (transmitted from the drive wheels to the road surface) remains insufficient.

Further, since such a 4WD vehicle is normally configured to be responsive to the difference between input and output rotation of the torque transferring device, it becomes necessary to increase rated torque capacity so as to suppress idling of the drive wheels. This will make manufacturing cost to rise.

An object of this invention is therefore to overcome the foregoing drawbacks by providing a control apparatus for a four-wheel drive vehicle that can control the driving force effectively so as to achieve required vehicle driving performance.

In order to achieve the object, this invention provides in its first aspect an apparatus for controlling operation of a four-wheel drive vehicle having a prime mover, drive wheels driven by the prime mover and free wheels, a torque transferring device installed between the drive wheels and free wheels to transfer torque generated in response to a difference between inputted and outputted rotation thereof, comprising: a rotation difference detecting unit that detects the difference between inputted and outputted rotation of the torque transferring device; a desired drive wheel speed calculating unit that calculates a desired rotational speed of the drive wheels driven by the prime mover; and a prime mover output decreasing unit that decreases output of the prime mover based on the desired rotational speed of the drive wheels when the calculated difference between inputted and outputted rotation of the torque transferring device is equal to or greater than a predetermined value.

In order to achieve the object, this invention provides in its second aspect a method of controlling operation of a four-wheel drive vehicle having a prime mover, drive wheels driven by the prime mover and free wheels, a torque transferring device installed between the drive wheels and free wheels to transfer torque generated in response to a difference between inputted and outputted rotation thereof, comprising the step of: detecting the difference between inputted and outputted rotation of the torque transferring device; calculating a desired rotational speed of the drive wheels driven by the prime mover; and decreasing output of the prime mover based on the desired rotational speed of the drive wheels when the calculated difference between inputted and outputted rotation of the torque transferring device is equal to or greater than a predetermined value.

BRIEF DESCRIPTION OF THE DRAWINGS

The above and other objects and advantages of the invention will be more apparent from the following description and drawings in which:

FIGS. 15A, B are a set of simulation data in which FIG. 15A illustrates total driving torque, etc., when the processing of FIG. 2 is not conducted

DETAILED DESCRIPTION OF THE PREFERRED EMBODIMENT

A preferred embodiment of a control apparatus for a four-wheel drive (4WD) vehicle according to the invention will now be explained with reference to the attached drawings.

Figure 1:
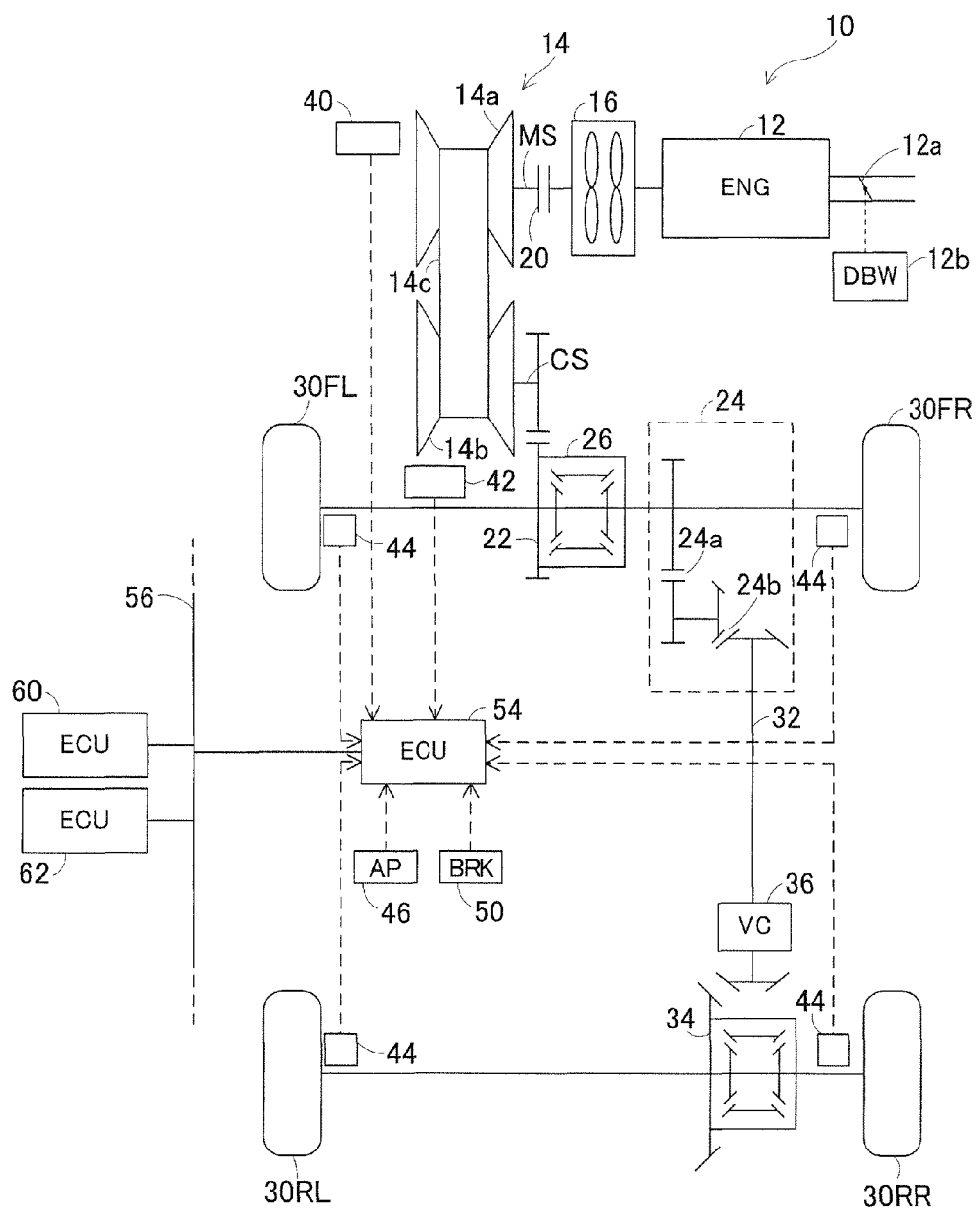
FIG. 1 is an overall view schematically showing a control apparatus for a four-wheel drive vehicle having a VC according to an embodiment of this invention.

FIG. 1 is an overall view schematically showing a control apparatus for a 4WD vehicle according to an embodiment of this invention.

In FIG. 1, a symbol 10 designates vehicle. The vehicle 10 is mounted with an internal combustion engine (prime mover;

hereinafter called the "engine") 12 that is a gasoline-injected, water-cooled engine. The vehicle 10 is a four-wheel vehicle.

In the engine 12, a throttle valve 12a installed at the air intake pipe is cut its mechanical connection with an accelerator pedal (not shown) provided near the operator's seat of the vehicle 10. Instead, the throttle valve 12a is connected to a DBW (Drive-By-Wire) mechanism 12b having an actuator such as an electric motor (not shown) and is driven (opened/closed) by the DBW mechanism 12b.

An output of the engine 12 is inputted to a Continuous Variable Transmission (transmission mechanism; hereinafter called the "CVT") 14. The CVT 14 comprises a drive pulley 14a installed at a main shaft MS, a driven pulley 14b installed at a countershaft CS, a metal belt 14c adapted to be wound (run) around the pulleys, and a hydraulic mechanism (not shown) adapted to supply the operating oil to the belt 14c.

The CVT 14 is inputted with an output of the engine 12 from the main shaft MS through a torque converter 16 and a forward clutch 20, and changes the engine output in speed with a continuously or steplessly controlled gear ratio.

The engine output after changed in speed by the CVT 14 is transmitted through the countershaft CS and a reduction gear 22 to a transfer 24. The transfer 24 comprises a helical gear 24a and a spiral bevel gear 24b, and distributes the engine output (transmitted by the CVT) to a front wheel side and rear wheel side.

The output for the front wheel side is transferred to front wheels 30FL, 30FR through a front differential mechanism 26. The output for the rear wheel side is transferred from the transfer 24 to rear wheels 30RL, 30RR through a propeller shaft 32 and a rear differential mechanism 34. Thus, the vehicle 10 is configured as an four-wheel drive type vehicle that changes the output of the engine 12 in speed by the CVT 14 and transmits the engine output to the front and rear wheels 30FL, 30FR, 30RL, 30RR to drive them.

A Viscous Coupling (torque transferring device; hereinafter called "VC") 36 is interposed at the propeller shaft 32. The VC 36 comprises a number of clutch plates housed in its case of and silicon oil (fluid) of high viscosity sealed therein. The VC 36 transfers power using the shear force generated by rotation difference between the plates.

An NDR sensor 40 installed near the drive pulley 14a of the CVT 14 produces an output or signal corresponding to input (drive side) rotational speed of the CVT 14, while an NDN sensor 42 installed near the driven pulley 14b produces an output or signal corresponding to output (driven side) rotational speed of the CVT 14.

A wheel speed sensor 44 is installed near each driveshaft (not shown) of the right and left front wheels 30FL, 30FR and that of the right and left rear wheels 30RL, 30RR and each of the sensors 44 produces an output or signal indicative of rotational speed (wheel speed) of the associated wheel 30FL, 30FR, 30RL or 30RR.

An accelerator position sensor 46 is installed near the accelerator pedal and produces an output or signal indicative of accelerator position or opening AP (an amount of depression of the accelerator pedal) by the driver (operator). A brake (BRK) switch 50 installed near a brake pedal (not shown) produces an ON signal upon manipulation of the brake pedal by the driver.

The outputs of the sensors and switch are sent to an Electronic Control Unit (ECU) 54 that has a microcomputer including a CPU, ROM, EEPROM, RAM, input/output circuits, and other components. The ECU 54 controls the operation of the CVT 14.

The ECU 54 is connected, through a CAN (Controller Area Network) 56, with a second ECU (FI-ECU) 60 that controls the operation of the engine 12 including fuel injection equipment and the CVT 14, and with a third ECU 62 that conducts traction control, anti-skid control, etc.

Next, the operation of the apparatus according to this embodiment will be explained.

Figure 2:
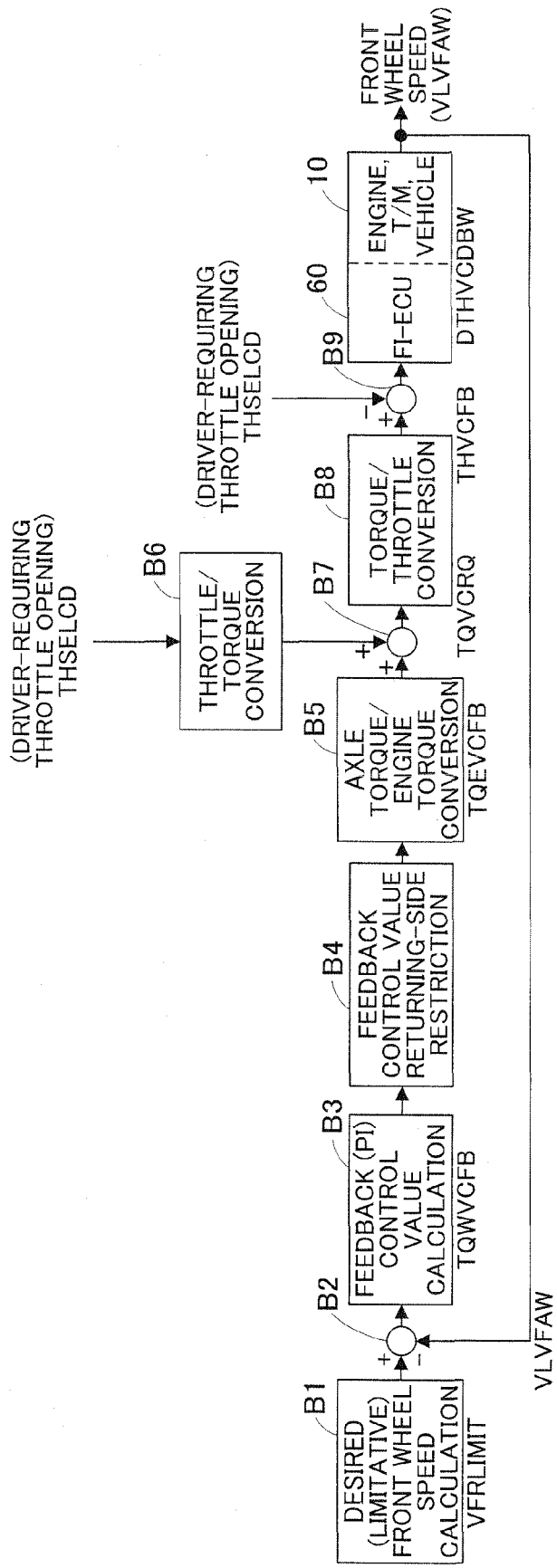
FIG. 2 is a block diagram showing the operation of the apparatus executed by blocks B1 to B9.

FIG. 2 is a block diagram showing the operation of the apparatus executed in blocks (units) B1 to B9 by the ECU 54 at predetermined intervals (e.g., 20 milliseconds).

Explaining the operation, it begins in a block (unit) B1 where a desired (limitative) front wheel speed (rotational speed) VFRLIMIT is calculated.

Figure 3:
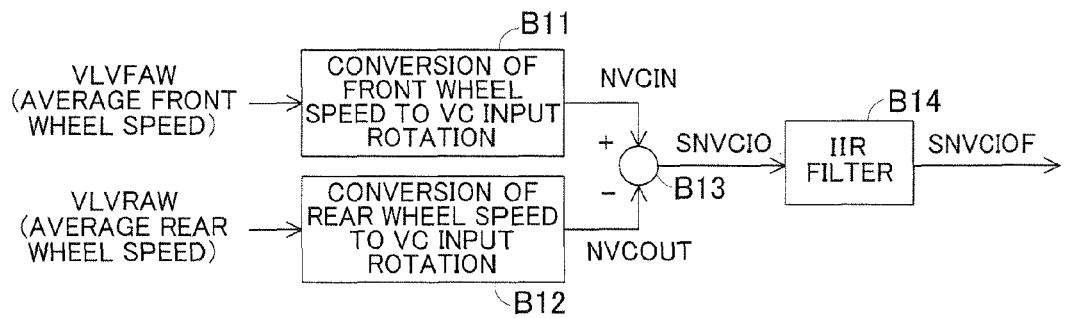
FIG. 3 is a block diagram showing the calculation of a first half in the block B1 illustrated in FIG. 2.
Figure 4:
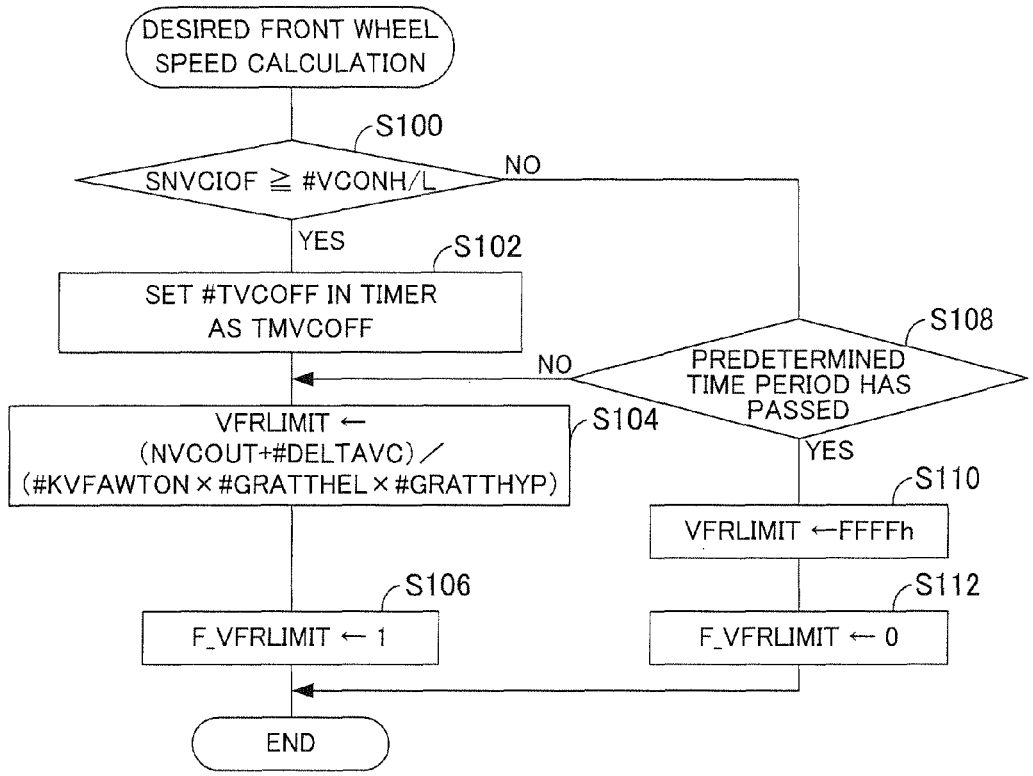
FIG. 4 is a flowchart showing that of a last half in the block B1 illustrated in FIG. 2.

FIG. 3 is a block diagram showing the calculation of a first half in the block B1 and FIG. 4 is a flowchart showing that of a last half in the block B1.

Explaining the calculation with reference to FIG. 3, an average front wheel speed (an average value of the rotational speeds of the front wheels 30FL, 30FR detected by the associated wheel speed sensors 44) VLVFAW and an average rear wheel speeds (an average value of the rotational speeds of the rear wheels 30RL, 30RR detected by the associated wheel speed sensors 44) VLVRAW are first calculated.

Next, the calculated values are inputted to blocks (units) B11, B12 where VC input rotation NVCIN (rotation (rotational speed) inputted to the VC 36) and VC output rotation NVCOUT (rotation (rotational speed) outputted from the VC 36) are calculated in accordance with equations shown below in the figure. In the equations, #KVFAWTON, #KVRAWTON: coefficients for converting the wheel speed to rotational speed; #GRATTHEL: reduction gear ratio of the helical gear 24a of the transfer 24; #GRATTHYP: reduction gear ratio of the spiral bevel gear 24b of the transfer 24; #GRATRRDF: reduction gear ratio of the rear differential mechanism 34.

Then a VC rotation difference SNVCIO between the inputted values (rotation difference of VC 36 NVCIN, NVCOUT) is calculated in block (unit) B13, and the calculated difference SNVCIO is inputted to a block (unit) B14 (Infinite Impulse Response filter) where the VC rotation difference is filtered to obtain a filtered VC rotation difference SNVCIOF. However, this block (filter) is not indispensable in the operation and may be omitted.

FIG. 4 is the a flowchart showing the last half processing in the block B1 to calculate the desired (limitative) front wheel speed VFRLIMIT using the value calculated in the processing of FIG. 3.

The program begins in S100 in which the (filtered) VC rotation difference SNVCIOF (calculated in the processing of FIG. 3) is compared with a predetermined value #VCONH/L to determine whether the difference is equal to or greater than the predetermined value, i.e., to determine whether the VC rotation difference is large.

The predetermined value #VCONH/L comprises two values #VCONH (higher value) and #VCONL (lower value), i.e., two values with hysteresis. Accordingly, the program proceeds to S102 if SNVCIOF>#VCONH, and to S108 if SNVCIOF<#VCONL.

When the result in S100 is affirmative, the program proceeds to S102 in which a timer (down-counter) is set with a prescribed value #TVCOFF as a timer value TMVCOFF to start time measurement. The timer value TMVCOFF indicates a predetermined time period in which control (explained below) is to be continued when the VC rotation difference becomes smaller than the predetermined value.

The program then proceeds to S104 in which the desired front wheel speed VFRLIMIT is calculated in accordance with equation illustrated there. In the equation, in addition to the parameters mentioned with reference to FIG. 3, there is used a parameter #DELTAVC indicates a necessary VC rotation difference that is determined from characteristic of VC torque (transmission torque) of the VC 36.

Figure 5:
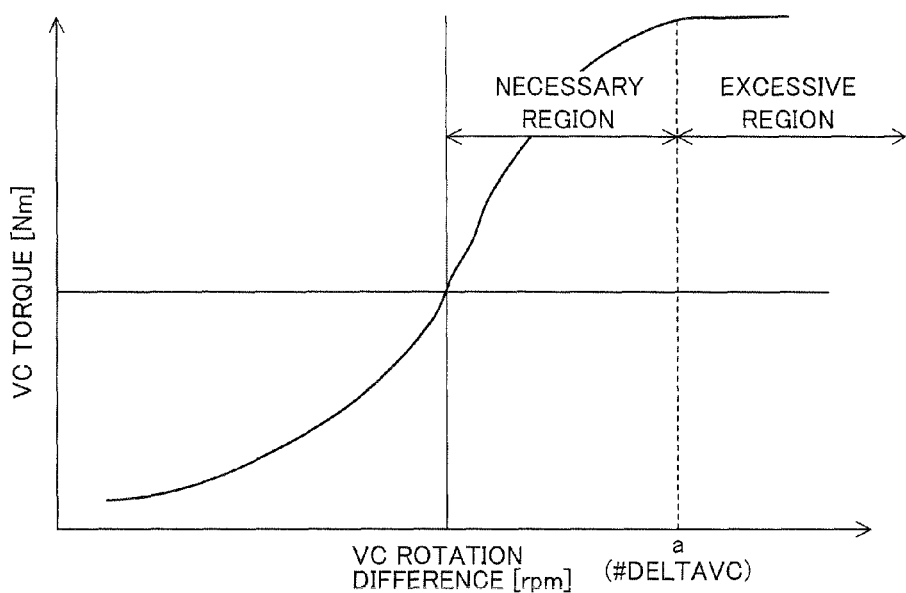
FIG. 5 is a graph showing the necessary VC rotation difference relative to VC torque.

FIG. 5 shows the necessary VC rotation difference relative to VC torque (transmission torque of the VC 36). In the figure, "excessive region" means a region where the front wheel rotation is excessive. The VC torque saturates in the region where the VC rotation difference exceeds a certain value a and the VC rotation difference becomes excessive.

Accordingly, in order to utilize the VC torque effectively, it is necessary to input an uppermost value of rotation difference in "necessary region" in the characteristics to the VC 36. In other words, it becomes necessary to input a value just before saturating (e.g., a in the figure) to the VC 36.

For that reason, in S104, the desired front wheel speed VFRLIMIT is calculated by adding the necessary VC rotation difference a (as the value #DELTAVC) to the rear wheel speed (=VC output rotation NVCOUT). The program next proceeds to S106 in which the bit of a flag F_VFRLIMIT is set to 1.

On the other hand, when the result is negative in S100, the program proceeds to S108 in which it is determined whether the aforesaid predetermined time period (in which the control is to be continued) has elapsed by discriminating whether the timer value has reached zero. When the result is negative, the program proceeds to S104 to calculate the desired value. Thus, the desired value is continually calculated until the predetermined time period has elapsed.

When the result is affirmative in S108, the program proceeds to S110 in which the desired front wheel speed VFRLIMIT is replaced by a non-usable value FFFFh, and to S112 in which the bit of the flag F_VFRLIMIT is reset to 0. As will be mentioned below, to set the flag bit to 1 means that the DBW mechanism 12*b* is to be operated, whereas to set the flag bit to 0 means that the DBW mechanism 12*b* is not to be operated.

Returning to the explanation of FIG. 2, the (average) front wheel speed VLVFAW (average of the actual front wheel speed detected by the wheel speed sensors 44) is subtracted from the calculated desired front wheel speed VFRLIMIT in a block (unit) B2 to obtain an error therebetween, which is then inputted to a feedback (PI) control value calculation block (unit) B3 where a feedback value TQWVCFB (comprising P (proportional) term and I (integral) term components) is calculated.

Figure 6:
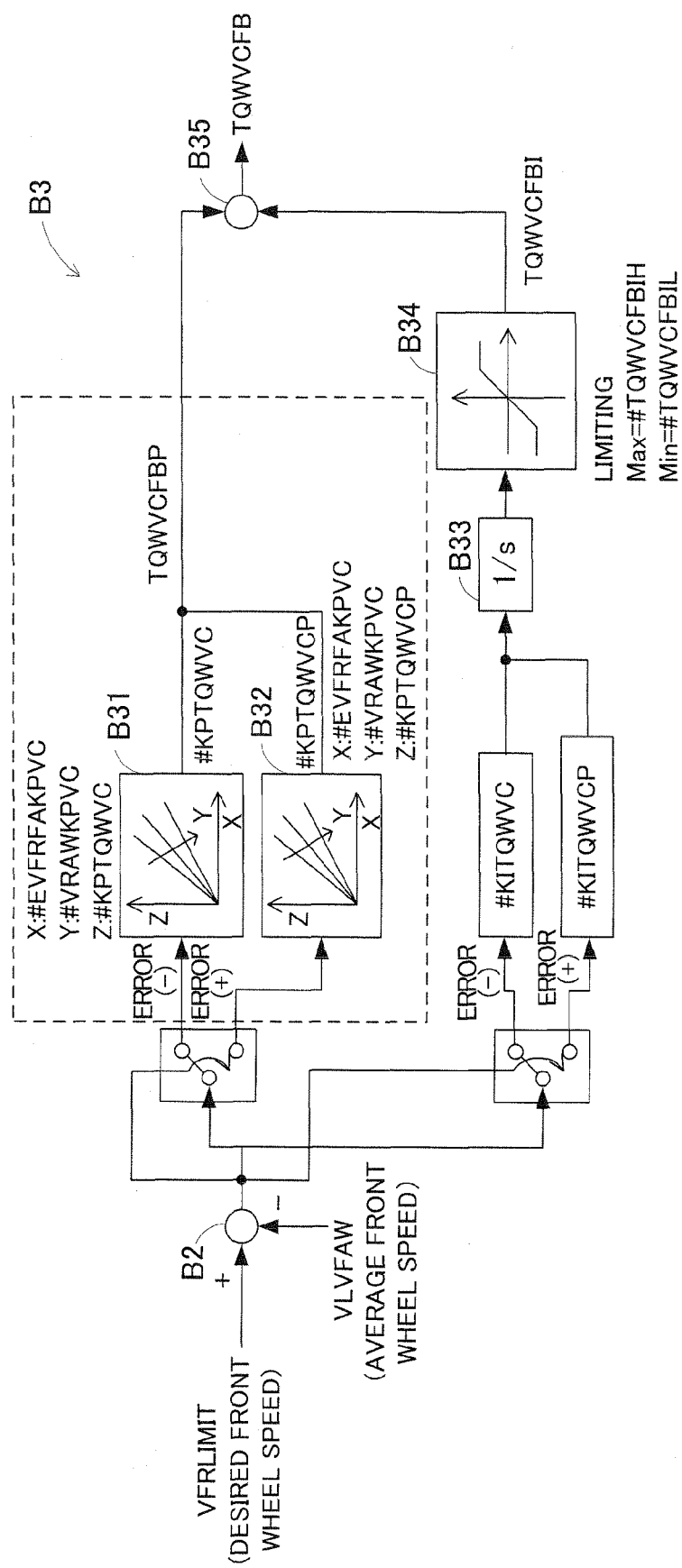
FIG. 6 is a block diagram showing the processing of the feedback P I term component calculation in the block B3 illustrated in FIG. 2.
Figure 7:
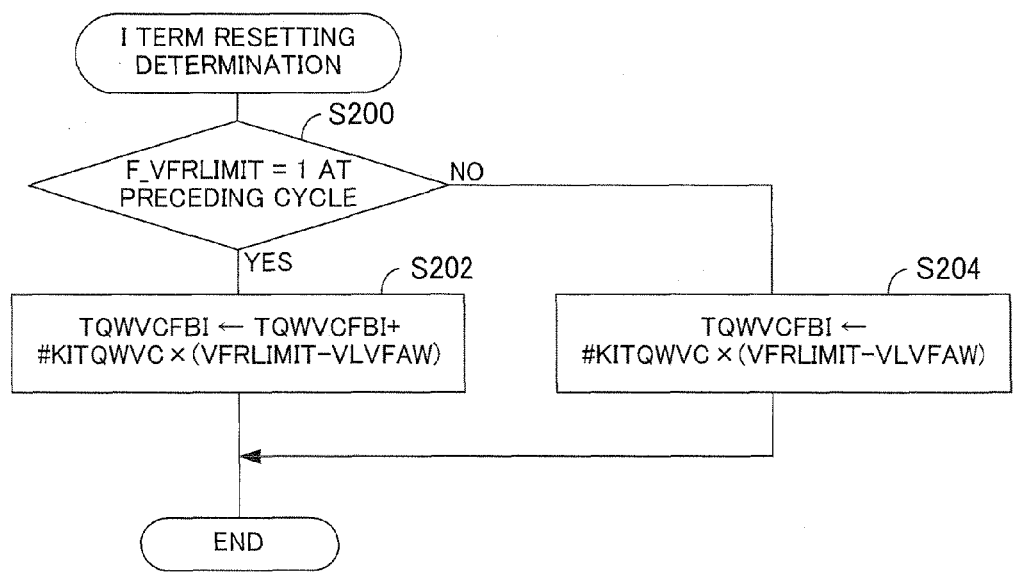
FIG. 7 is a flowchart showing processing of resetting of the I term component calculated by the processing illustrated in FIG. 6.

FIG. 6 is a block diagram showing the processing of the feedback PI term component calculation in the block B3 and FIG. 7 is a flowchart showing processing of resetting of the I term component calculated by the processing illustrated in FIG. 6.

Explaining the P term component calculation with reference to FIG. 6, it is discriminated whether the polarity of the error inputted from the block B2 is plus or minus. When it is minus, the P term component #KPTQWVC is calculated by retrieving upper characteristics B31 by a VC rotation difference #EVFRFAKPVC and a wheel speed #VRAWKPVC.

On the other hand, when the error is plus, the P term component #KPTQWVCP is calculated by retrieving lower characteristics B32 by the VC rotation difference #EVFRFAKPVC and wheel speed #VRAWKPVC.

The calculated P term component #KPTQWVC or #KPTQWVACP is re-named as TQWVCFBP. In the above, the VC rotation difference #EVFRFKPVC corresponds to the aforesaid VC rotation difference SNVCIOF, and the wheel speed #VRAWKPVC corresponds to the aforesaid (average) rear wheel speed VLVRAW.

As is seen from the characteristics B31, B32, the P term component #KPTQWVC or #KPTQWVCP is calculated to be increased (in other words the throttle opening TH is decreased) with increasing VC rotation difference #EVFRFAKPVC, and is calculated to be increased with decreasing (average) rear wheel speed #VRAWKPVC. The characteristics B31, B32 are set beforehand such that the throttle opening TH determined by the value TQWVCFBP calculated based on B31 is lesser than that calculated based on B32.

Explaining the calculation of the I term component TQWVCFBI, when the error is minus, the I term component #KITQWVC is calculated, whereas when the error is plus, the I term component #KITQWVCP is calculated. The calculated I term component is integrated by an integrator (block (unit) B33) and the integrated value is subject to limiting by a limiter (block (unit) B34).

The I term component experienced with the limiting is named as TQWVCFBI and is added with the P term component TQWVCFBP in a block (unit) B35 to calculate the feedback control value TQWVCFB. The feedback control value TQWVCFB is calculated as a control value to control axle torque, i.e., a torque on the axle of the front wheels 30F.

The I term component TQWVCFBI thus calculated is reset if a certain condition is met.

Explaining this with reference to FIG. 7, the program begins in S200 in which it is determined whether the bit of the flag F_VFRLIMIT in the preceding (the control cycle 20 milliseconds earlier) was set to 1, and when the result is affirmative, the program proceeds to S202 in which the I term component is accumulated in accordance with an equation shown there (i.e., is integrated in the integrator (B33)).

On the contrary, when the result in S200 is negative, the program proceeds to S204 in which the accumulation of the I term component is terminated, in other words, the I term component is reset, as shown in an equation illustrated there. Specifically, the accumulated I term component is reset when the VC rotation difference is determined to be not large, in other words the I term component is reset when it is determined that idling of the drive wheel was suppressed. With this, it becomes possible to carry over the I term component to the control during next cycle.

Returning to the explanation of the FIG. 2, the feedback control value TQWVCFB (calculated in the block B3) is sent to a feedback control value returning-side restriction block (unit) B4 in which processing to restrict returning (opening) of the throttle valve 12*a* is conducted.

Figure 8:
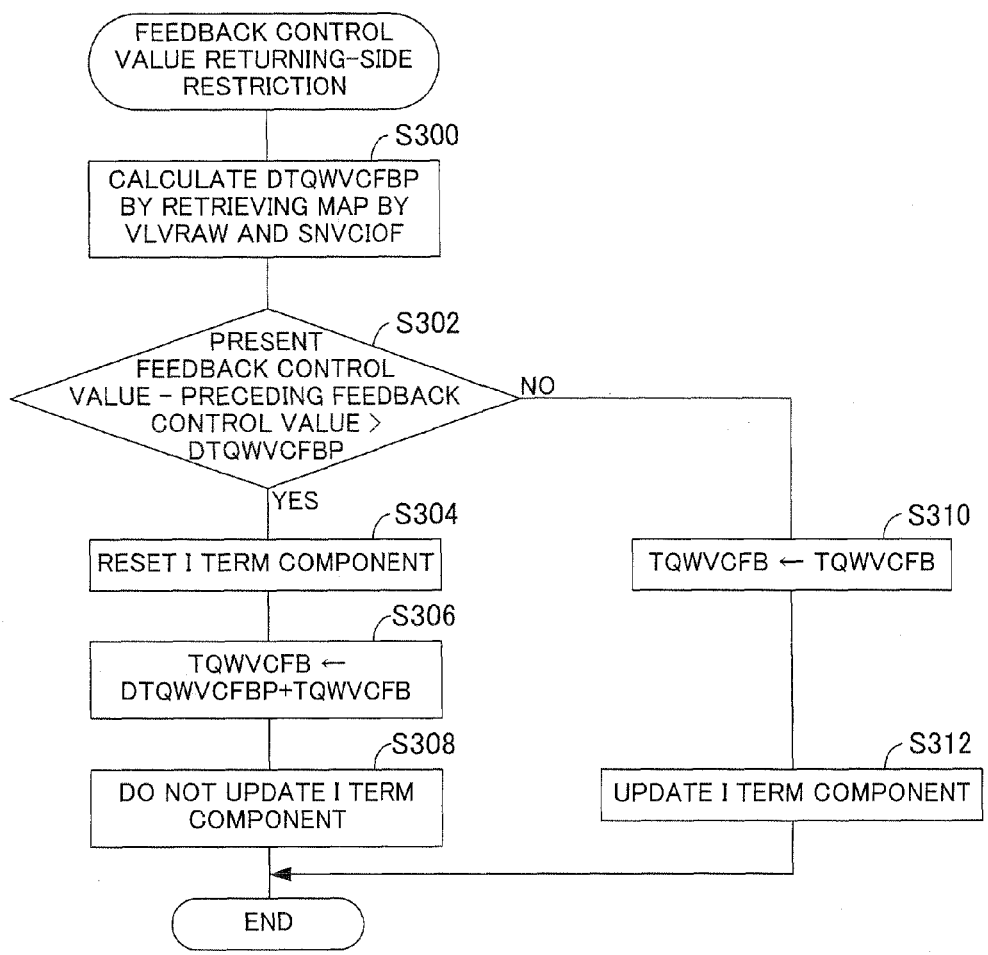
FIG. 8 is a flowchart showing processing of the block B4 illustrated in FIG. 2.

FIG. 8 is a flowchart showing the processing of the block B4.

The program begins in S300 in which a returning limit (threshold value) DTQWVCFBP is calculated by retrieving a map (prepared beforehand) by the (average) rear wheel speed VLVRAW and the VC rotation difference SNVCIOF. The limit is calculated such that it increases with decreasing (average) rear wheel speed and increasing VC rotation difference.

The program then proceeds to S302 in which the preceding feedback control value TQWVCFB (value calculated in the preceding control cycle) is subtracted from present feedback control value TQWFCFB (value calculated in the present control cycle) and it is determined whether the resultant difference is greater than the returning limit DTQWVCFBP calculated at S300.

Outlining the restriction processing of FIG. 8, the embodiment is configured in such a manner that the throttle opening is controlled solely in the closing direction from that determined by the driver's manipulation (more specifically, a driver-requiring throttle opening THSELCD). Accordingly, the processing is intended to restrict drastic change of the throttle opening in the opening (increasing) direction.

Thus, the returning-side in the feedback control value means to move the throttle valve 12*a* in the opening direction.

As usual the opening direction of the throttle valve is expressed in plus and that in the closing direction is expressed in minus in the feedback control value. The returning limit DTQWVCFBP is calculated to be a plus value sufficient to discriminate drastic throttle opening change in the opening direction.

The comparison in S302 will be explained more specifically. Assuming that TQWVCFB of the present control cycle is −10 and that of the preceding control cycle is −30, the difference=−10−(−30)=+20, which indicates that the throttle valve 12a should be opened by 20. When the limit is calculated to be +15, for example, the decision in S302 is affirmative.

Accordingly, if the decision is affirmative in S302, in other words when it is determined that the throttle opening changes drastically in the opening direction, the program proceeds to S304 in which the aforesaid I term resetting is conducted in the same manner as that mentioned in S204, and to S306 in which the feedback control value TQWVCFB is added with the returning limit DTQWVCFBP to correct the same so as to slow down returning (opening) of the throttle valve 12a.

The program then proceeds to S308 in which the I term component is not updated and the program is terminated, since returning of the throttle opening is determined to be drastic.

On the other hand, when the decision in S302 is negative, in other words, when it is determined that returning of the throttle opening is not drastic or the throttle opening changes in the closing direction, the program proceeds to S310 in which the feedback control value TQWVCFB is kept as it is, and to S312 in which the I term component is updated and the program is terminated.

Returning to the explanation of FIG. 2, the calculated feedback control value TQWVCFB is inputted to an axle torque/engine torque conversion block (unit) B5 where the feedback control value is converted to torque of the engine 12, which is then converted to a throttle opening THVCFB in blocks (units) B6 to B8.

Figure 9:
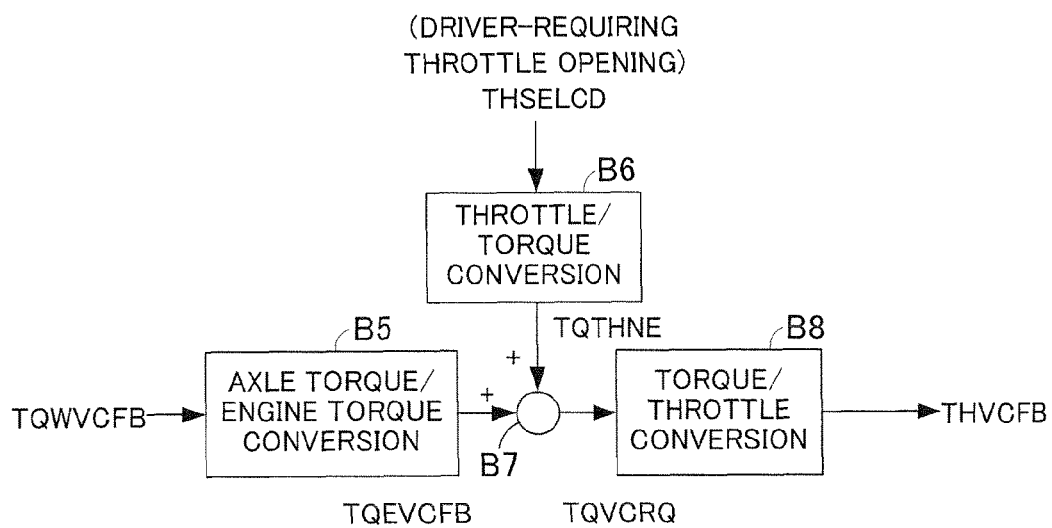
FIG. 9 is a block diagram showing processing in the blocks B5 to B8 illustrated in FIG. 2.

FIG. 9 is a block diagram showing processing in the blocks B5 to B8.

Since torque of the engine 12 changes depending on the ratio of CVT 14, the feedback control value (calculated in the feedback (PI) control value calculation block B3) TQWVCFB is inputted to the axle toque/engine torque conversion block B5 where the value TQWVCFB is converted to a value TQEVCFB that indicates the torque of the engine 12.

Further, since the control value (manipulated variable) is calculated as a change amount from the throttle opening TH (more specifically, a driver-requiring throttle opening THSELCD) in the embodiment as mentioned above, the driver-requiring throttle opening THSELCD is once converted to a torque value. The throttle opening TH (i.e., the driver-requiring throttle opening THSELCD) is detected from a rotation amount of the actuator such as an electric motor of the DBW mechanism 12b in the second ECU 60.

Figure 10:
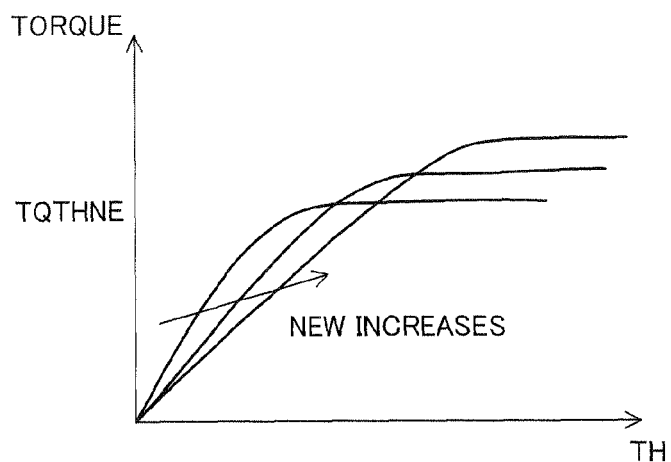
FIG. 10 is a graph showing characteristics of a map used in the processing of FIG. 9.

The conversion to torque is conducted by retrieving a map (whose characteristics are shown in FIG. 10) by the detected throttle opening TH (i.e., the driver-requiring throttle opening THSELCD) and engine speed NEW (detected by the second ECU 60) to calculate the engine torque TQTHNE. The characteristics of the map shown in FIG. 10 are those at temperature 25° C.

The engine torque TQEVCFB calculated in B5 and engine torque TQTHNE calculated in B6 are added together in B7. The total engine torque TQVCRQ thus obtained is then inputted in B8 where it is converted to a throttle opening TH and a desired throttle opening THVCFB is calculated.

Figure 11:
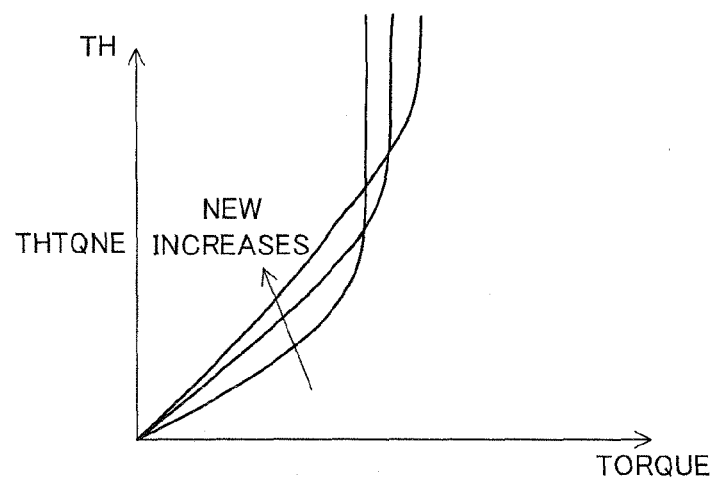
FIG. 11 is a graph showing characteristics of a map used in the processing of FIG. 9.

The conversion to throttle opening TH is conducted by calculating the desired throttle opening THVCFB by retrieving a map (whose characteristics are shown in FIG. 11) by torque (i.e., TQVCRQ) and engine speed NEW. This conversion is in inverse relation to that conducted in B6.

In B8, the calculated desired throttle opening THVCFB is compared with a lower throttle opening limit THVCFBMIN (not shown). The lower limit THVCFBMIN indicates a minimum throttle opening necessary for the engine 12 to maintain idling, i.e., a minimum throttle opening for preventing the engine 12 from being stalled. When the calculated desired throttle opening THVCFB is smaller than the lower limit THVCFBMIN, the desired throttle opening THVCFB is replaced by the lower limit THVCFBMIN.

Returning to the explanation of FIG. 2, next in a block (unit) B9, the driver-requiring throttle opening THSELCD is subtracted from the calculated desired throttle opening THVCFB to calculate a throttle opening closing amount DTHVCDBW. This is because the desired value is determined not directly, but is determined indirectly as a throttle closing amount from the opening required by the driver as is frequently mentioned.

Figure 12:
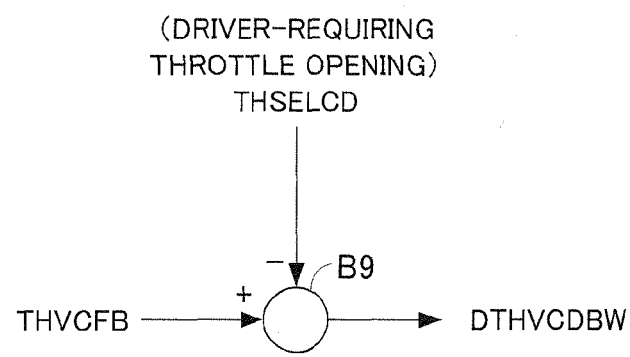
FIG. 12 is a block diagram showing calculation of the block B9) illustrated in FIG. 2.
Figure 13:
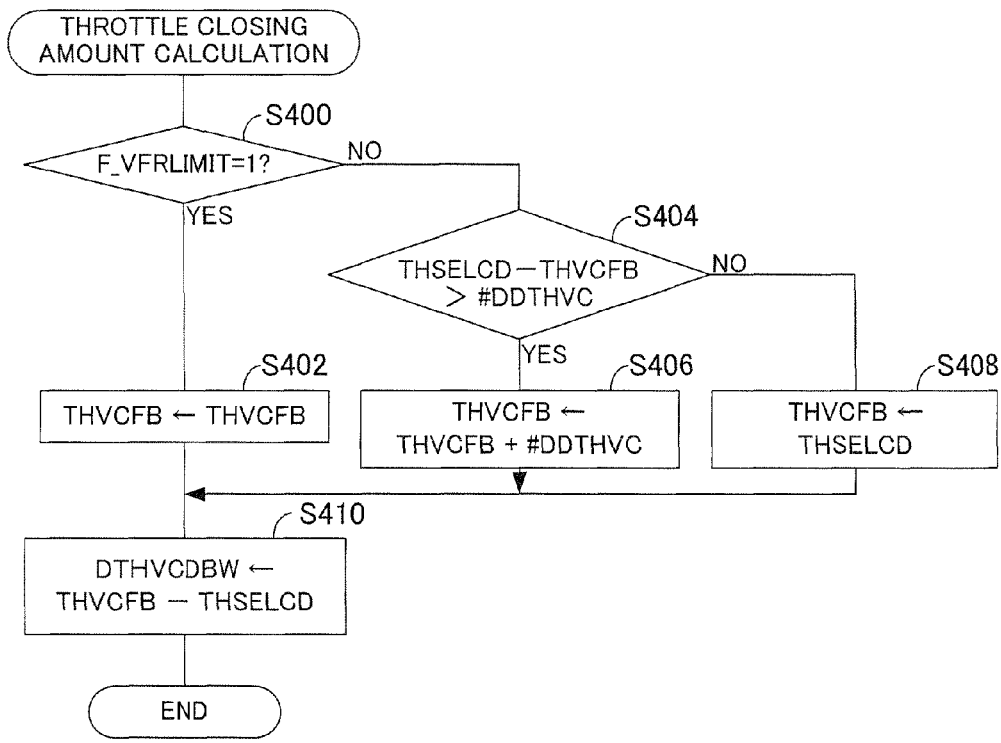
FIG. 13 is a flowchart showing the calculation of the block B9) in detail.

FIG. 12 is a block diagram showing the calculation of the throttle opening closing amount DTHVCDBW and FIG. 13 is a flowchart showing this in detail.

Explaining the calculation with reference to FIG. 13, the program begins in S400 in which it is determined whether the bit of the flag F_VFRLIMIT is set to 1 and if the decision is affirmative, the program proceeds to S402 in which the desired throttle opening THVCFB (converted in B8) is kept as it is.

On the other hand, when the decision in S400 is negative, the program proceeds to S404 in which the difference obtained by subtracting the desired throttle opening THVCFB from the driver-requiring throttle opening THSELCD is greater than a threshold value #DDTHVC.

When the decision in S404 is affirmative, the program proceeds to S406 in which the desired throttle opening THVCFB is added with the threshold value #DDTHVC to correct the same, whereas when the decision is negative, the program proceeds to S408 in which the desired throttle opening THVCFB is replaced by the driver-requiring throttle opening THSELCD.

The program next proceeds to S410 in which a difference DTHVCDBW is calculated by subtracting the driver-requiring throttle opening THSELCD from the desired throttle opening THVCFB.

Again returning to the explanation of FIG. 2, the difference DTHVCDBW is inputted to the FI-ECU 60. The FI-ECU 60 controls operation of the DBW 12b based on the inputted value. Specifically, it controls operation of the DBW 12b to move the throttle valve 12a in the closing direction (to decrease output of the engine 12).

In the processing shown in FIG. 13, after completion of this control, returning (opening) of the throttle valve 12a is slowed down so as not to cause drastic motion. Specifically, a smaller one between the driver-requiring throttle opening THSELCD and the sum of THVCFB and #DDTHVC is selected as the desired throttle opening THVCFB.

As stated above, the embodiment is configured to have an apparatus for and method of controlling operation of a four-wheel drive vehicle (10) having a prime mover (12), drive wheels (30F) driven by the prime mover and free wheels (30R), a torque transferring device (viscous coupling 36) installed between the drive wheels and free wheels to transfer torque generated in response to a difference between inputted and outputted rotation thereof, comprising: a rotation difference detecting unit (ECU 54, B1 (B11 to B13)) that detects the difference between inputted and outputted rotation (SNV-CIOF) of the torque transferring device; a desired drive wheel speed calculating unit (ECU 54, B1, S100-S104) that calculates a desired rotational speed of the drive wheels (VFR-LIMIT) driven by the prime mover; and a prime mover output decreasing unit (ECU 54, 60, DBW mechanism 12b, B3-B9) that decreases output of the prime mover based on the desired rotational speed of the drive wheels when the calculated difference between inputted and outputted rotation of the torque transferring device (SNVCIOF) is equal to or greater than a predetermined value (#VCONH/L).

Explaining the above with reference to FIG. 5, if the gear ratio of the rear differential mechanism 34 is multiplied by the VC torque shown in the figure, the product will indicate rear wheel driving torque. As will be understood from FIG. 5, the rear wheel driving torque increases with increasing rotation difference of the VC 36 and saturates in due course.

Figure 14:
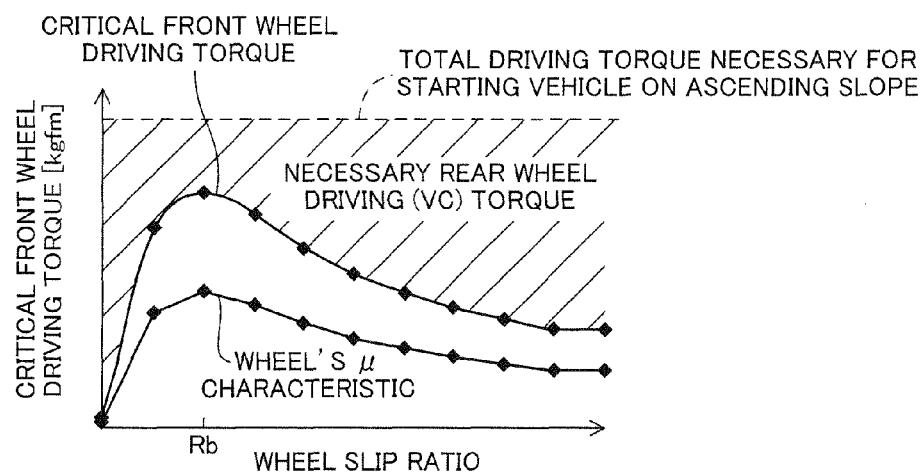
FIG. 14 is a graph showing critical front wheel driving torque relative to wheel slip ratio of the vehicle illustrated in FIG. 1.

Here, if idling (slipping) amount of the front wheel is reduced, critical front wheel driving torque will increase. To be more specific, characteristic of the coefficient of friction μ of the wheel 30 (relationship between wheel (tire) slip ratio and the coefficient of friction) on snowy road will be as shown in FIG. 14. As mentioned before, the product obtained by multiplying the front wheel contact load by the coefficient of friction indicates the front wheel driving torque (force) on a low frictional road such as snowy road. As can be understood from FIG. 14, gripping force (critical front wheel driving torque) increases as the front wheels slip (idle). However, when the slip exceeds a saturating point (shown as "Rb" in the figure), the gripping force decreases.

Accordingly, when total driving torque of the vehicle 10 necessary for starting on a low friction road such as an ascending snowy slope is expressed by broken lines in FIG. 14, the difference from the broken lines (total driving torque) and critical front wheel driving torque will be the rear wheel driving torque (VC torque) necessary for the situation.

The embodiment is based on these findings and is configured such that the output of the prime mover (engine) 12 is decreased based on the desired rotational speed of the drive wheels (front wheels) 30F when the calculated inputted and outputted rotation difference of the torque transferring device (SNVCIOF) is equal to or greater than a predetermined value (#VCONH/L).

With this, it becomes possible to suppress idling (slipping) amount of the front wheel 30F in the vicinity of the saturating point (Rb in FIG. 14) and to control the driving force effectively so as to achieve required vehicle driving performance.

Further, when it is configured to be responsive to the rotation difference between the input and output of the VC 36, it is not necessary to increase rated torque capacity so as to suppress idling of the drive wheels.

Figure 15A:
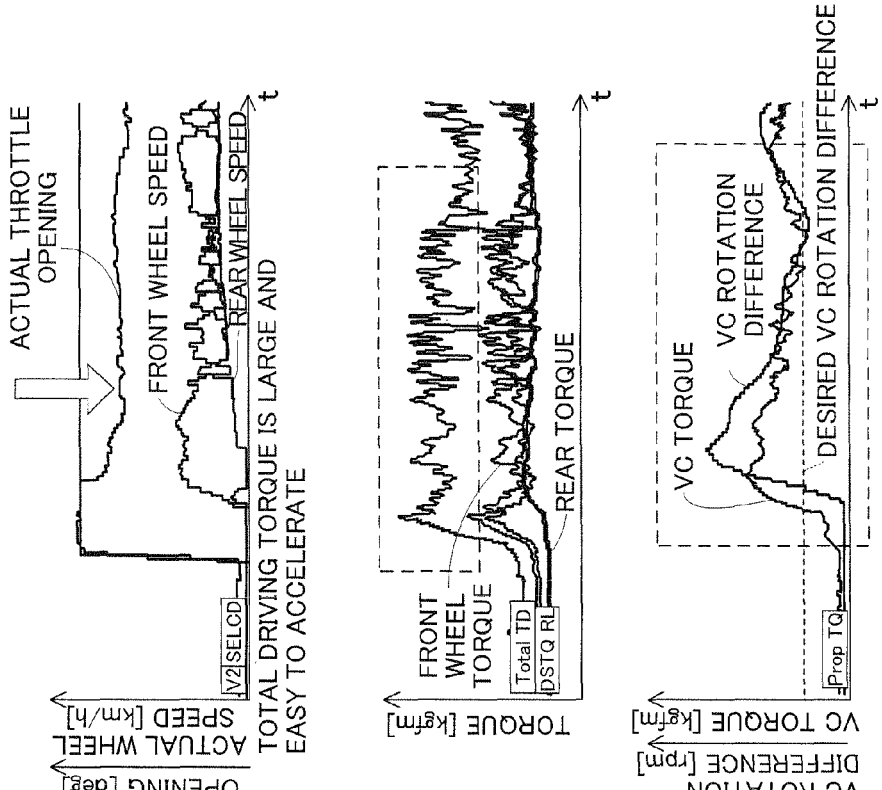
Figure 15B:
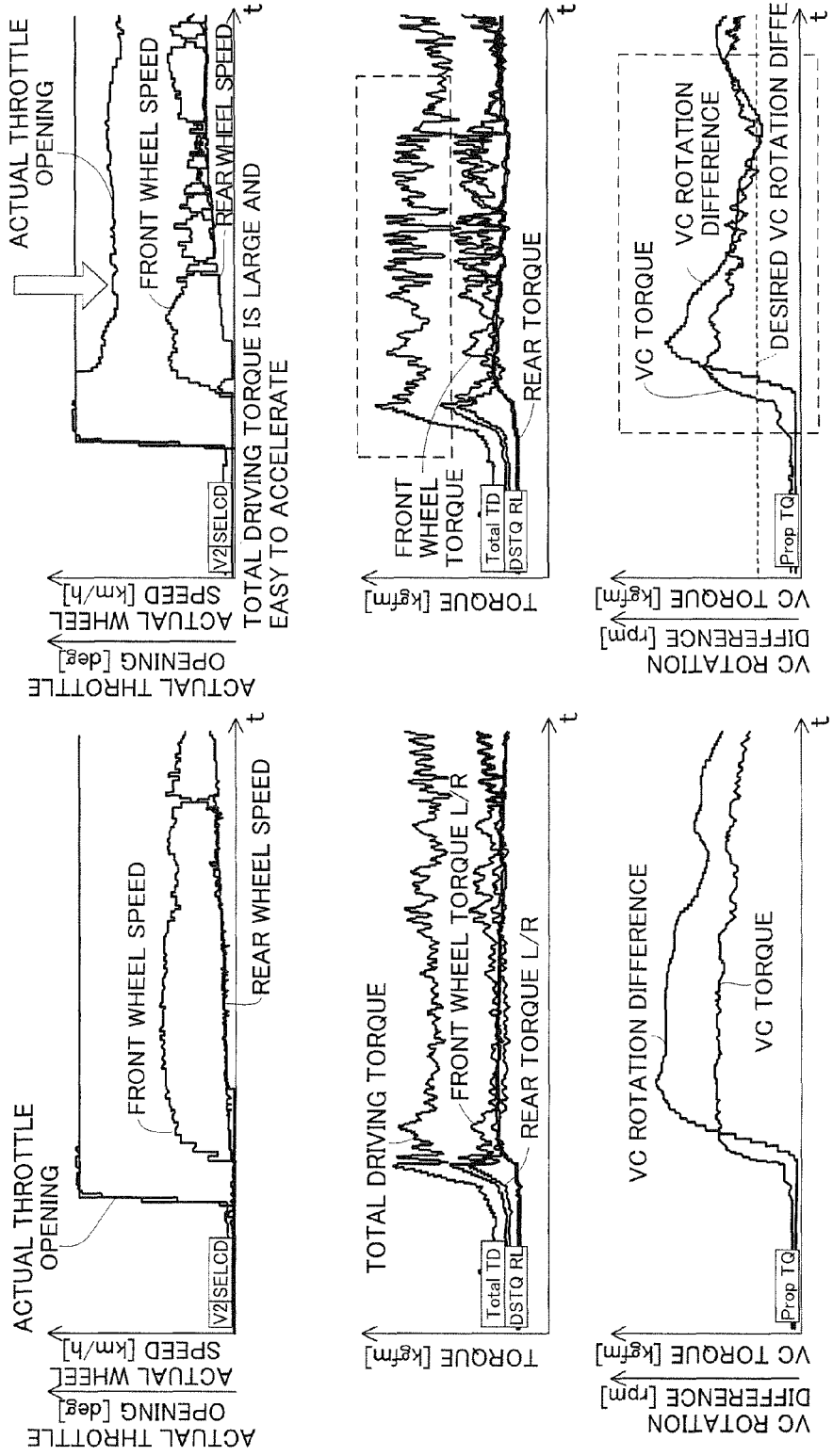
FIG. 15B illustrates the total driving torque, etc., when the processing of FIG. 2 is conducted.

FIGS. 15A, B are a set of simulation data in which FIG. 15A illustrates the total driving torque, etc., when the processing of FIG. 2 is not conducted and FIG. 15B illustrates the total driving torque, etc., when the processing of FIG. 2 is conducted. From the comparison of 15A and 15B, it will be understood that the total driving torque is increased with the processing of FIG. 2.

In the apparatus and method, the desired drive wheel speed calculating unit calculates the desired rotational speed of the drive wheels (VFRLIMIT) by adding a value (a) determined from torque transferring characteristic of the torque transferring device to the outputted rotation of the torque transferring device (NVCOUT). With this, in addition to the effects mentioned above, it becomes possible to utilize the torque of the torque transferring device (VC 36) effectively by using a value just before saturating (e.g., a in FIG. 5) to the VC 36, thereby enabling to achieve required vehicle driving performance more surely.

In the apparatus and method, the prime mover output decreasing unit calculates a desired axle torque (TQEVCFB) based on the desired rotational speed of the drive wheels (VFRLIMIT) and decreases the output of the prime mover based on the calculated desired axle torque. As mentioned above, the feedback control value TQWVCFB is calculated as a control value to control axle torque, i.e., a torque on the axle of the front wheels 30F. With this, in addition to the effects mentioned above, it becomes possible to decreases the output of the prime mover more appropriately.

In the apparatus and method, the prime mover output decreasing unit calculates the desired axle torque based on the desired rotational speed of the drive wheels such that the desired axle toque (TQEVCFB) decreases with increasing difference between inputted and outputted rotation of the torque transferring device (SNVCIOF). With this, in addition to the effects mentioned above, it becomes possible to decreases the output of the prime mover more appropriately.

In the apparatus and method, the rime mover output decreasing unit calculates the desired axle torque (TQEVCFB) based on an error between the desired rotational speed of the drive wheels (VFRLIMIT) and detected rotational speed of the drive wheels (VLVFAW). With this, in addition to the effects mentioned above, it becomes possible to decrease the output of the prime mover more appropriately.

It should be noted that although the viscous coupling 36 is taken as an example of the torque transferring device, any other device can instead be used if it can transfer torque between the drive and driven wheels.

It should also be noted that although the CVT is taken as an example of a transmission, this invention is applicable to any four-wheel drive vehicle having an automatic transmission that allows different distinct gear ratios to be selected.

It should also be noted that although the internal combustion engine is taken as an example of the prime mover, this invention is applicable to any four-wheel drive vehicle having an electric motor or a hybrid of the engine and motor.

Japanese Patent Applications No. 2009-277166 filed on Dec. 7, 2009, and No. 2010-251522 filed on Nov. 10, 2010 are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling operation of a four-wheel drive vehicle having a prime mover, drive wheels driven by the prime mover and free wheels, a torque transferring device installed between the drive wheels and free wheels to transfer torque generated in response to a difference between inputted and outputted rotation thereof, comprising:

a rotation difference detecting unit that detects the difference between inputted and outputted rotation of the torque transferring device;

a desired drive wheel speed calculating unit that calculates a desired rotational speed of the drive wheels driven by the prime mover by adding a value determined from a torque transferring characteristic of the torque transferring device to the outputted rotation of the torque transferring device; and a prime mover output decreasing unit that decreases output of the prime mover based on the desired rotational speed of the drive wheels when the calculated difference between inputted and outputted rotation of the torque transferring device is equal to or greater than a predetermined value.

2. The apparatus according to claim 1, wherein the prime mover output decreasing unit calculates a desired axle torque based on the desired rotational speed of the drive wheels and decreases the output of the prime mover based on the calculated desired axle torque.

3. The apparatus according to claim 2, wherein the prime mover output decreasing unit calculates the desired axle torque based on the desired rotational speed of the drive wheels such that the desired axle toque decreases with increasing difference between inputted and outputted rotation of the torque transferring device.

4. The apparatus according to claim 2, wherein the prime mover output decreasing unit calculates the desired axle torque based on an error between the desired rotational speed of the drive wheels and detected rotational speed of the drive wheels.

5. A method of controlling operation of a four-wheel drive vehicle having a prime mover, drive wheels driven by the prime mover and free wheels, a torque transferring device installed between the drive wheels and free wheels to transfer torque generated in response to a difference between inputted and outputted rotation thereof, comprising the steps of:

detecting, by a rotation difference detecting unit, the difference between inputted and outputted rotation of the torque transferring device;

calculating by a desired drive wheel speed calculating unit, a desired rotational speed of the drive wheels driven by the prime mover, wherein the desired rotational speed is calculated by adding a value determined from a torque transferring characteristic of the torque transferring device to the outputted rotation of the torque transferring device; and decreasing, by a prime mover output decreasing unit, output of the prime mover based on the desired rotational speed of the drive wheels when the calculated difference between inputted and outputted rotation of the torque transferring device is equal to or greater than a predetermined value.

6. The method according to claim 5, wherein the step of prime mover output decreasing calculates a desired axle torque based on the desired rotational speed of the drive wheels and decreases the output of the prime mover based on the calculated desired axle torque.

7. The method according to claim 6, wherein the step of prime mover output decreasing calculates the desired axle torque based on the desired rotational speed of the drive wheels such that the desired axle toque decreases with increasing difference between inputted and outputted rotation of the torque transferring device.

8. The method according to claim 6, wherein the step of prime mover output decreasing calculates the desired axle torque based on an error between the desired rotational speed of the drive wheels and detected rotational speed of the drive wheels.

* * * * *